US007365968B2

(12) United States Patent
Chen et al.

(10) Patent No.: US 7,365,968 B2
(45) Date of Patent: Apr. 29, 2008

(54) ELECTRONIC DEVICE AND IMAGE CONFIGURATION THEREOF

(75) Inventors: Liang-Yi Chen, Tainan County (TW); Wen-Ching Hsieh, Taipei County (TW); Chun-Chao Chiu, Taipei County (TW)

(73) Assignee: Benq Corporation, Taoyuan (TW)

( * ) Notice: Subject to any disclaimer, the term of this patent is extended or adjusted under 35 U.S.C. 154(b) by 157 days.

(21) Appl. No.: 11/195,678

(22) Filed: Aug. 3, 2005

(65) Prior Publication Data

US 2006/0028794 A1 Feb. 9, 2006

(30) Foreign Application Priority Data

Aug. 5, 2004 (TW) .............................. 93123480 A

(51) Int. Cl.
*G06F 1/16* (2006.01)
*G09F 19/00* (2006.01)

(52) U.S. Cl. .................. 361/681; 446/268; 248/122.1; 378/37; 40/406

(58) Field of Classification Search ................ 348/345; 435/6, 287; 446/268; 378/37; 235/462.07, 235/462.32; 248/917–923; 361/679–687, 361/724–727; 40/406
See application file for complete search history.

(56) References Cited

U.S. PATENT DOCUMENTS

| | | | | |
|---|---|---|---|---|
| 6,216,989 | B1 * | 4/2001 | Shioya et al. | 248/122.1 |
| 6,477,799 | B1 * | 11/2002 | Erickson et al. | 40/406 |
| 2004/0114714 | A1 * | 6/2004 | Minyard et al. | 378/37 |
| 2006/0009115 | A1 * | 1/2006 | Saucier | 446/268 |

FOREIGN PATENT DOCUMENTS

| | | |
|---|---|---|
| TW | 571960 | 5/2003 |

* cited by examiner

*Primary Examiner*—Hung Van Duong
(74) *Attorney, Agent, or Firm*—Birch, Stewart, Kolasch & Birch, LLP

(57) ABSTRACT

An electronic device. An image configuration is disposed on a housing of the electronic device. The image configuration comprises a base and a patterned portion. The patterned portion has a center of gravity differing from a rotation center that pivoted on the base. When the electronic device is in a forth orientation, a line between the center of gravity and the rotation center of the patterned portion is substantially parallel to a direction of gravity.

20 Claims, 12 Drawing Sheets

ELECTRONIC DEVICE AND IMAGE CONFIGURATION THEREOF

BACKGROUND

The present invention relates to an electronic device, and in particular to an electronic device comprising a rotatable image configuration for keeping mark or logo thereof at a predetermined status.

Logos or other indicia are conventionally fixed on the outer surface of a product. But on the electronics which are capable of being placed in more than one orientation, such as notebooks, foldable phones, or displays, it is inconvenient to recognize logos/indicia when the electronic device transfers from one orientation to another orientation.

SUMMARY

The invention provides an electronic device comprising a housing and a rotatable image configuration thereon. The image configuration disposed on the housing, comprises a base and a patterned portion. The patterned portion includes a rotation center pivotally connected to the base and a center of gravity differing from the rotation center of the patterned portion. When the electronic device is placed in a forth orientation, a line between the center of gravity and the rotation center of the patterned portion is substantially parallel to a direction of gravity. The symbolism of the patterned portion can be easily recognized by the observers without adjusting his or her position to view the patterned portion. That is to say, regardless of the electronic device's orientation, the rotatable image configuration substantially keeps in a display status.

BRIEF DESCRIPTION OF THE DRAWINGS

The present invention can be more fully understood by reading the subsequent detailed description and examples with references made to the accompanying drawings, wherein.

DETAILED DESCRIPTION

Figure 3A:
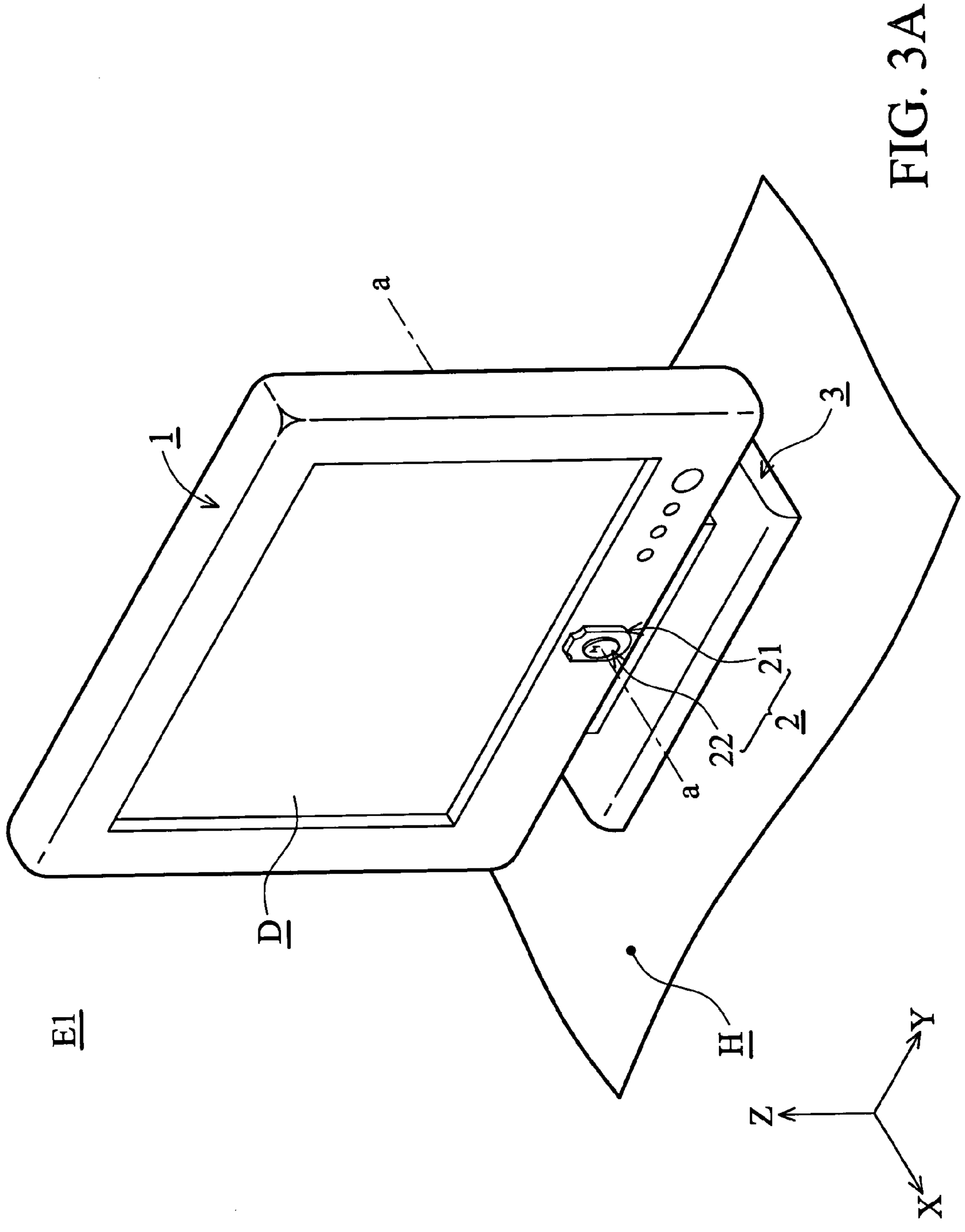
FIG. 3A is a perspective view of an exemplary display (E1) equipped with the image configuration (2) in a third orientation.
Figure 4A:
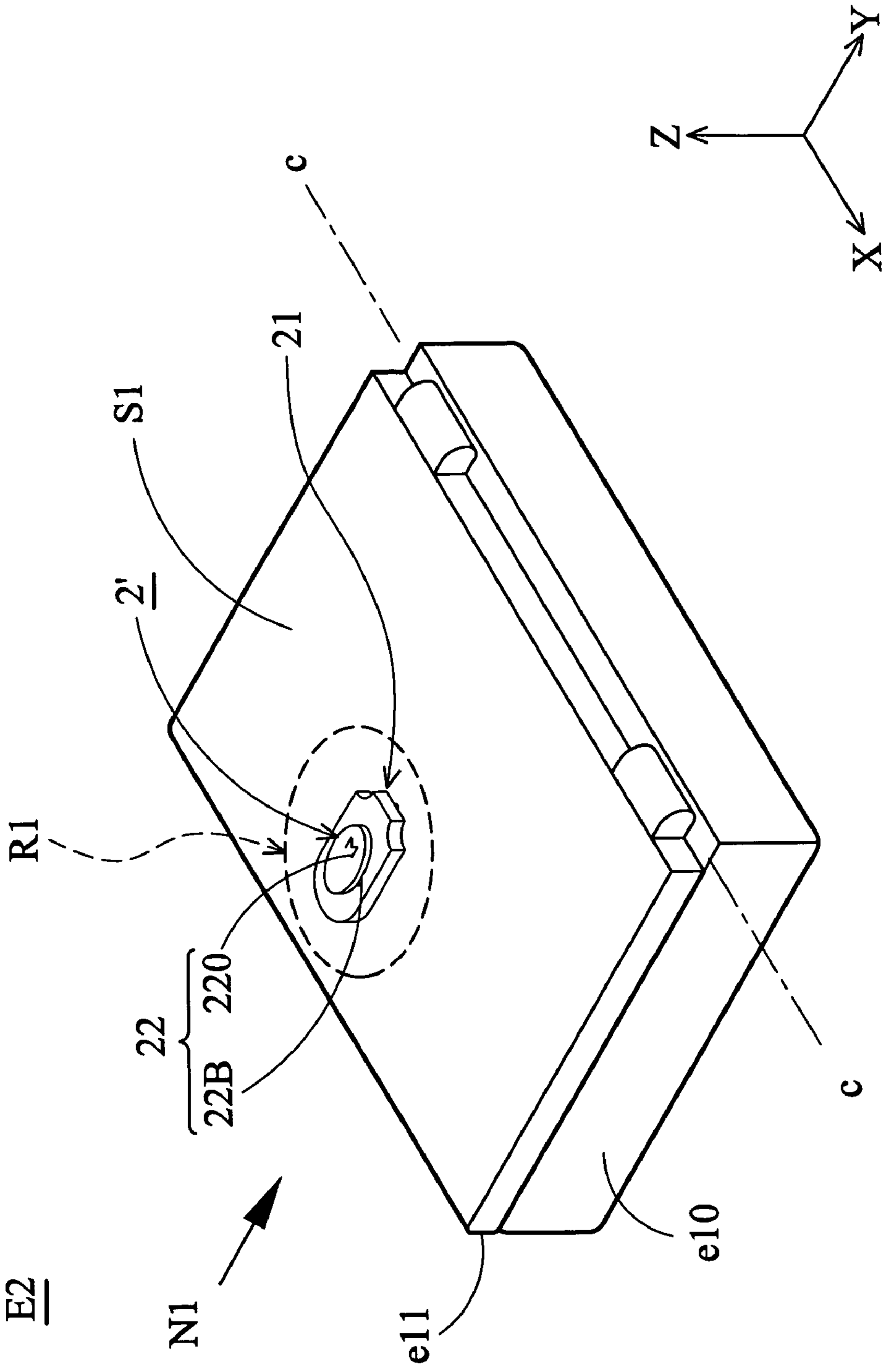
FIG. 4A is a perspective view of an exemplary notebook (E2) equipped with the image configuration (2') in a third orientation.
Figure 4B:
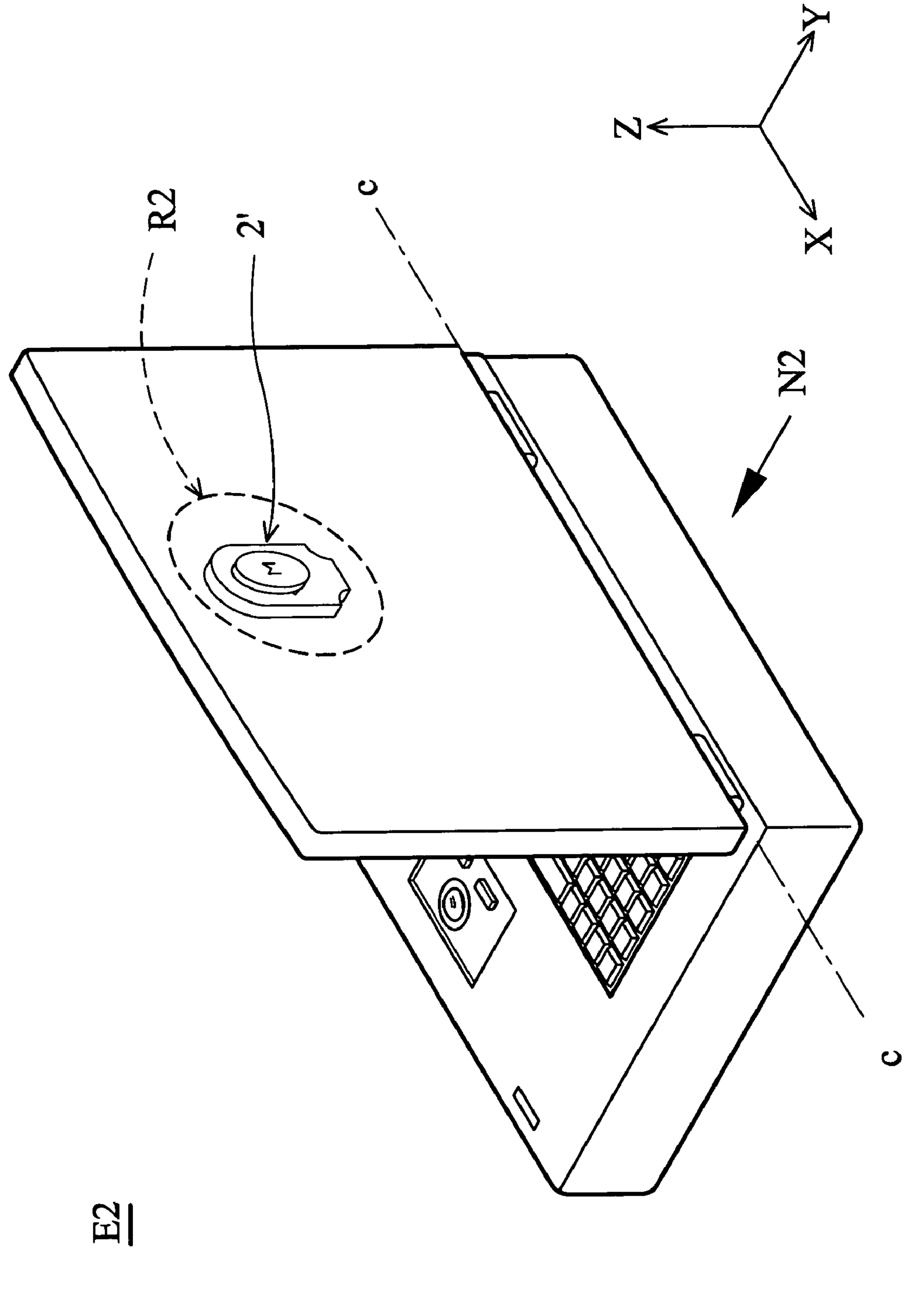
FIG. 4B is a perspective view of the notebook (E2) of FIG. 4A in a forth orientation.

Referring to FIGS. 3A and 4B., two exemplary electronic devices E1 and E2 of the invention are a display and a notebook equipped with two image configurations 2 and 2', representing mark or logo thereof, respectively. A rectangular coordinates XYZ with three coordinate axes X, Y and Z defines the geometric structure and location of the display E1 and the notebook E2.

Figure 1A:
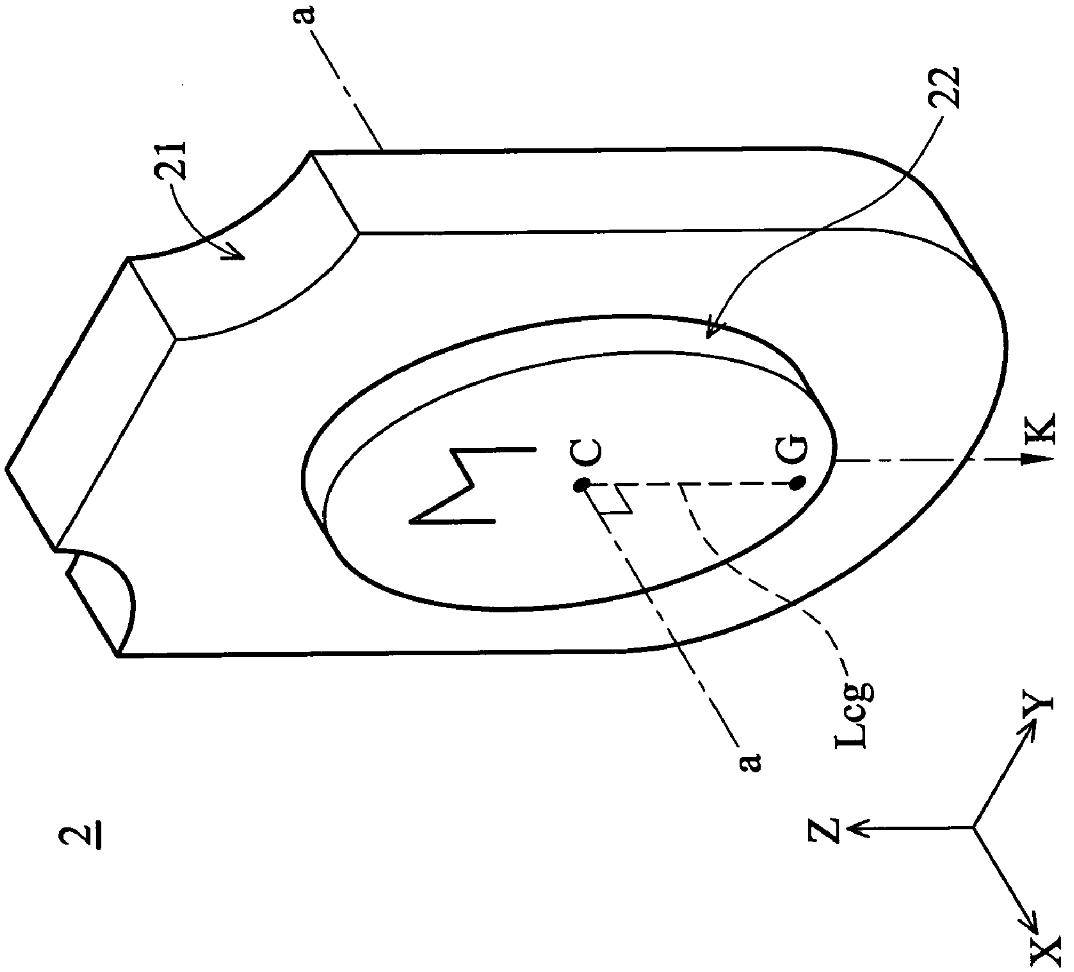
FIG. 1A shows a first embodiment of an image configuration (2) of the invention in a first orientation.
Figure 1B:
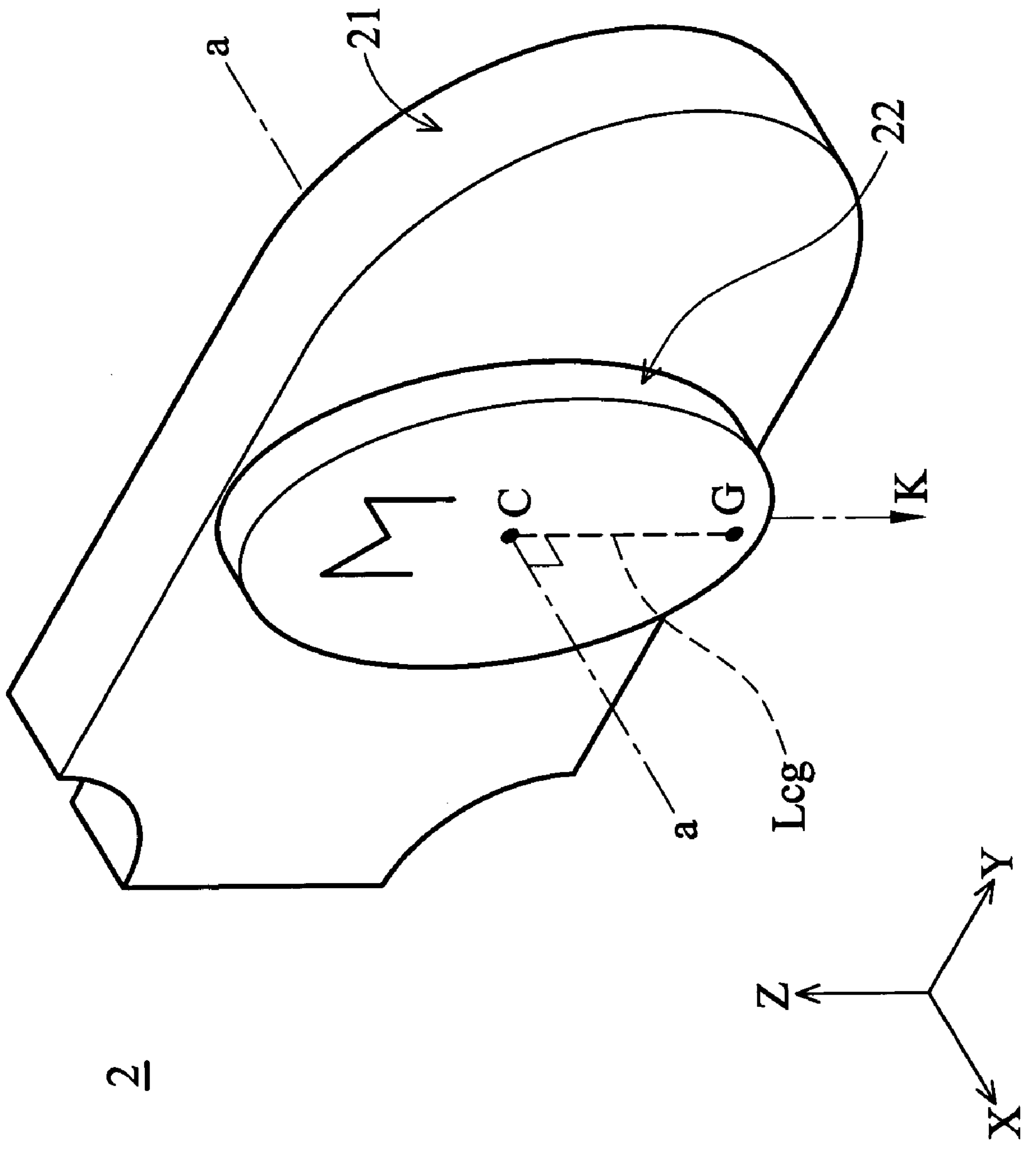
FIG. 1B shows the image configuration (2) in FIG. 1A in a second orientation.
Figure 2A:
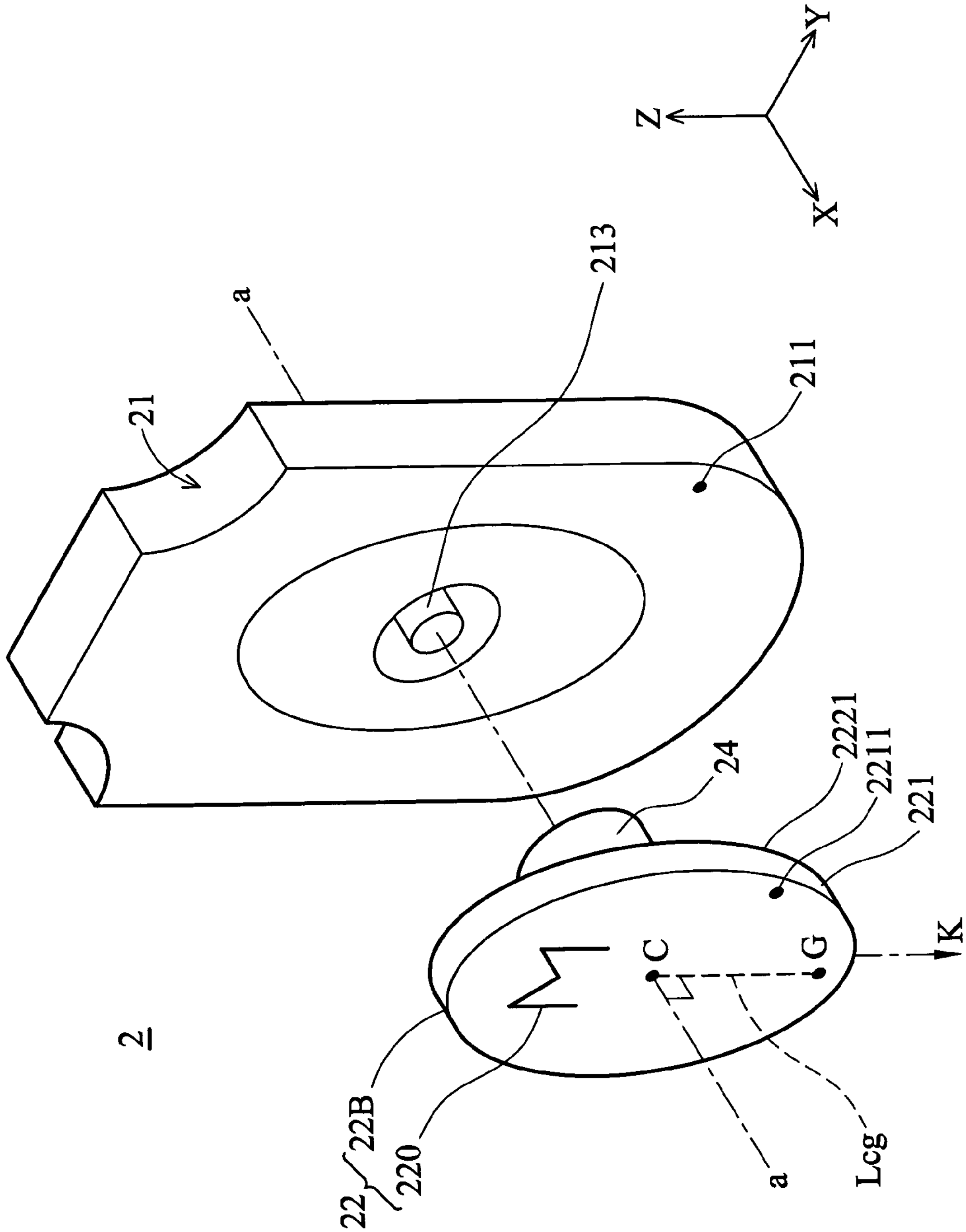
FIG. 2A is an exploded view of the image configuration (2) of FIG. 1A.

FIGS. 1A and 1B show a first embodiment of an image configuration 2 of the invention in a first and a second orientation, respectively. FIG. 2A is an exploded view of the image configuration 2 of FIG. 1A, and FIG. 2B is another perspective view of the image configuration 2 of FIG. 2A.

Figure 2B:
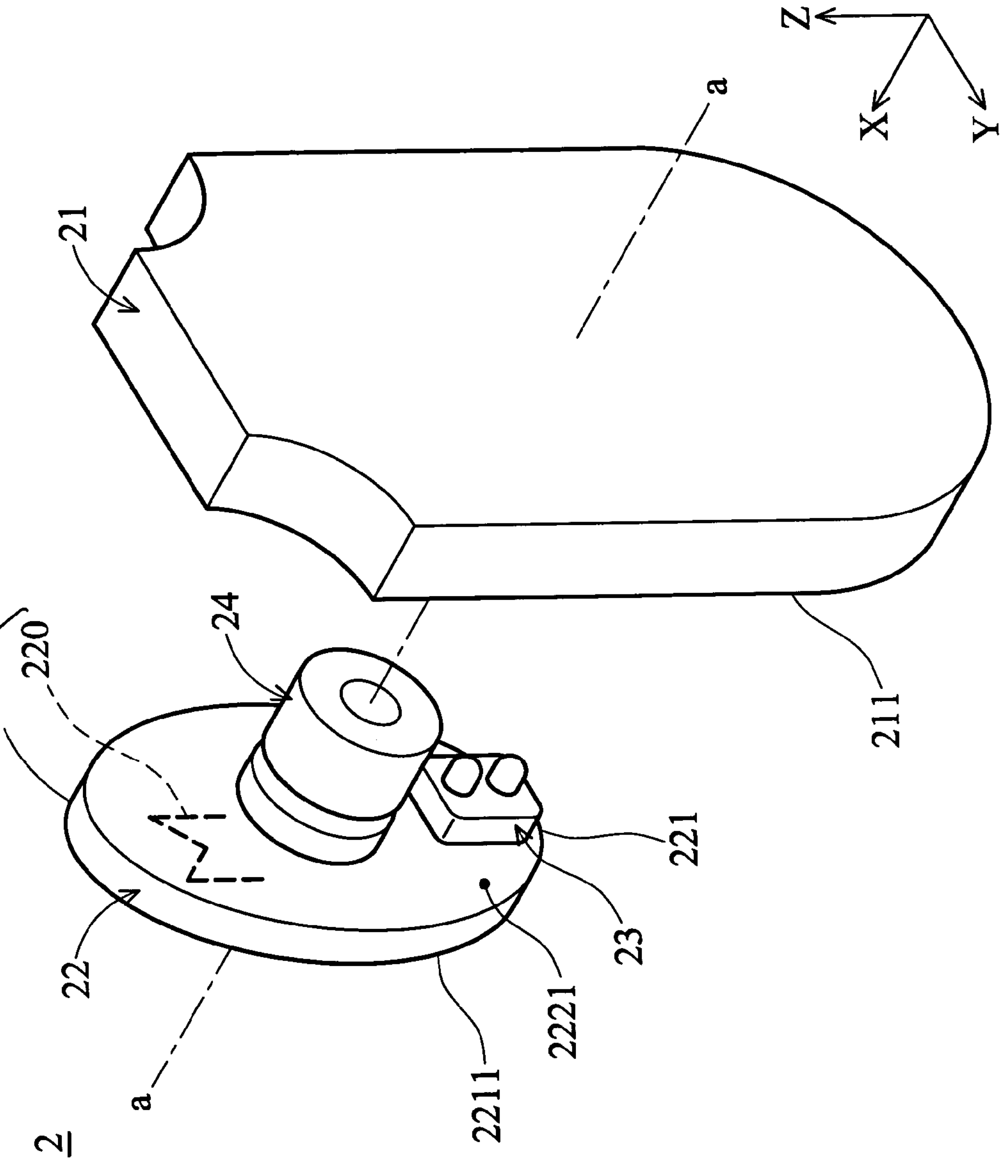
FIG. 2B is another perspective view of the image configuration (2) of FIG. 2A.

As shown in FIG. 2A and FIG. 2B, the image configuration 2 comprises a base 21, and a patterned portion 22. The base 21 is substantially rectangular, comprising an outer surface 211 and a male 213 formed on the surface 211. The patterned portion 22 includes a weight 23 and a female 24 connecting with the male 213. In the first embodiment, the male 213 is a post, and the female 24 is a bearing.

The patterned portion 22 comprises a body 22B and an index 220 thereon. The body 22B has a rotation center C on an axis a-a, and the bearing 24 disposed around the rotation center C pivots on the post 213 along the axis a—a, hence the patterned portion 22 is rotatably disposed on the base 21. The index 220 is disposed on an outer surface 2211 of the body 22B, and the bearing 24 is outwardly disposed on another outer surface 2221 of the body 22B. As shown in FIGS. 2A and 2B, the axis a—a is parallel to the coordinate axis X, and the body 22B moves on a plane YZ about the axis a—a. Here, the index 220 is a letter M, but is not limited thereto. In other cases, the patterned portion 22 can be selected from other letters or the group of letters, or numbers, symbols, marks, flat patterns, cubic patterns, combinations thereof, or other indicia.

In FIGS. 2A and 2B, the weight 23 is disposed near a side 221 on the outer surface 2221 of the body 22B. Therefore, the body 22B has a center of gravity G differing from the rotation center C of the body 22B, and the center of gravity G is adjacent to the side 221 of the body 22B. $L_{cg}$ represents a line between the rotation center C and the center of gravity G of the body 22B, and K represents a direction of gravity. The direction of gravity K is always directed to the center of the earth.

When the image configuration 2 moves from the first orientation (as FIG. 1A) to a second orientation (as FIG. 1B), the line $L_{cg}$ is substantially parallel to the direction of gravity K, the patterned portion 22 is rotated with the weight 23, and substantially keeps in a display status, i.e., the index 220 would not be tilted and remains in a normal letter M.

Figure 2C:
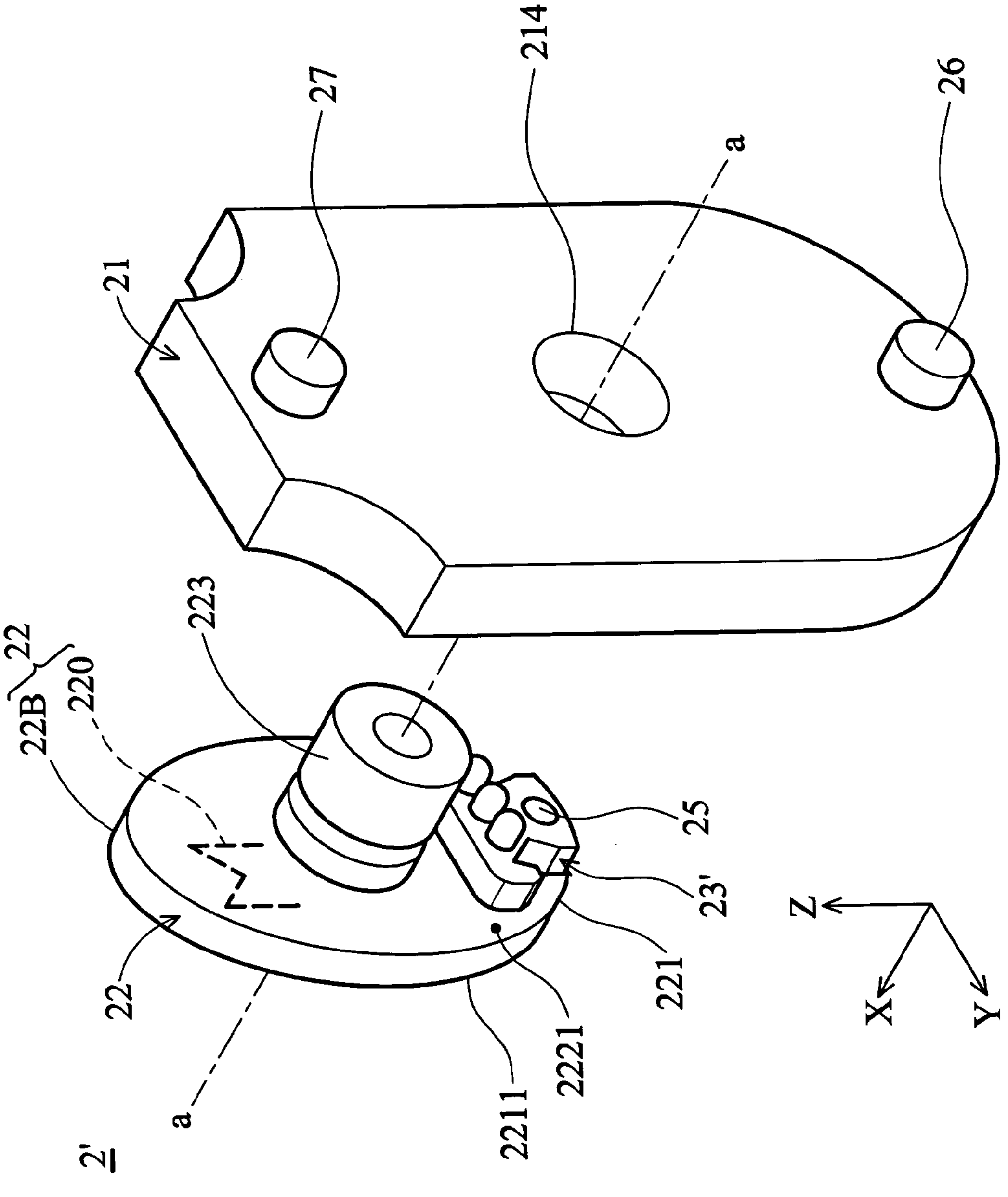
FIG. 2C is an exploded view of a second embodiment of the image configuration (2') of the invention.

FIG. 2C is an exploded view of a second embodiment of the image configuration 2' of the invention. Differing from the first embodiment, the patterned portion 22 comprises a male 223 and a weight 23' with a first magnet 25; the base 21 comprises a pair of second magnets 26 and 27 opposite to the first magnet 25 and a female 214 receiving the male 223.

In the second embodiment, the male 223 is a shaft, and the female 214 is a hole. The male 223 disposed around the rotation center C pivots on the female 214 along the axis a—a. The weight 23' disposed near the side 221 further includes a first magnet 25 which is attracted by the second magnet 26 or 27 opposite to the first magnet 25. When the image configuration 2' moves from a first orientation to a forth second, the patterned portion 22 is rotated with the weight 23', and the attraction between the first magnet 25 and the second magnet 26 or 27 helps to locate the patterned portion 22 in a display status. And further description would be illustrated in the forth embodiment.

Figure 3B:
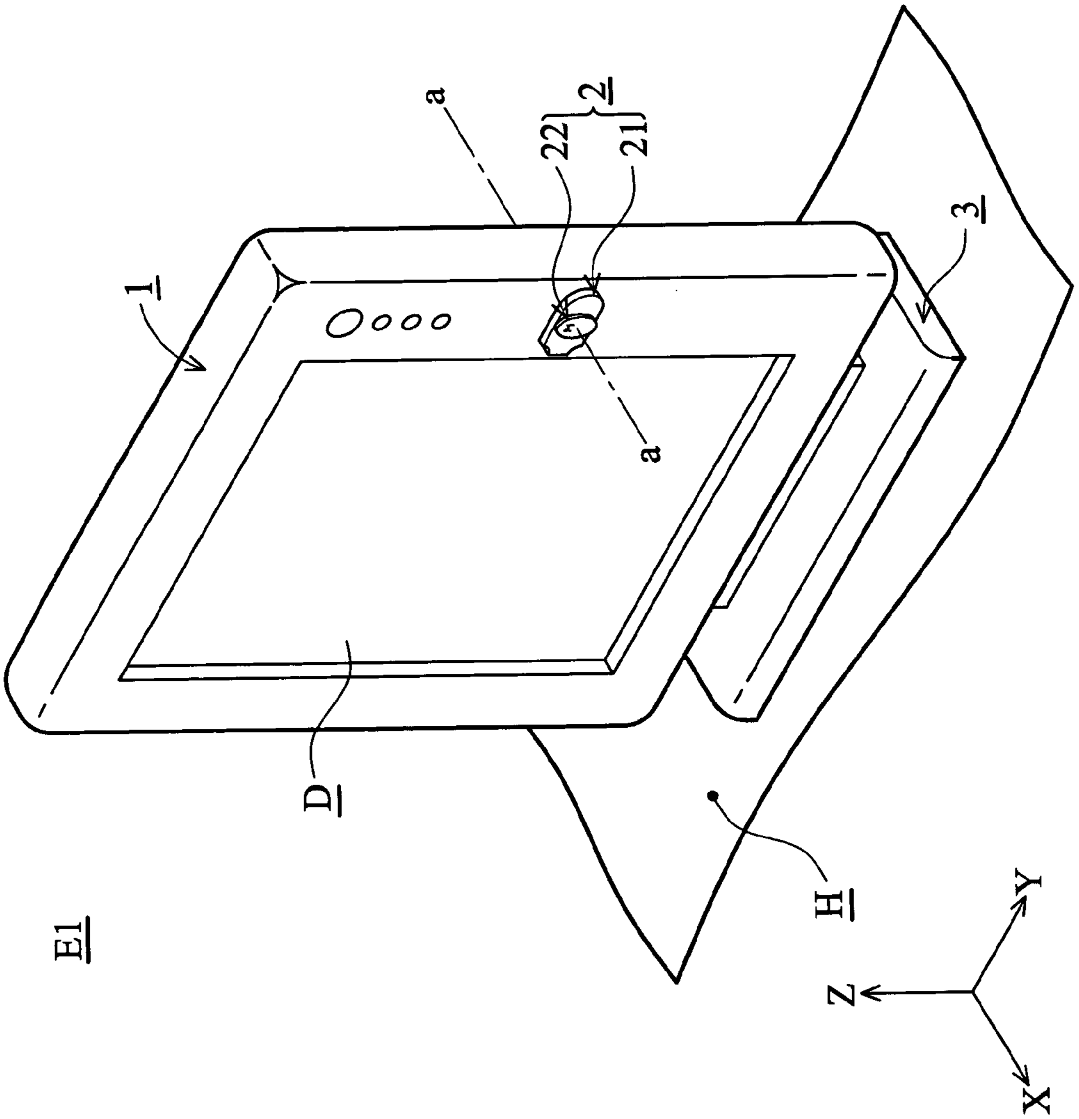
FIG. 3B is a perspective view of the display (E1) of FIG. 3A in a forth orientation.

FIGS. 3A and 3B show a third embodiment of an electronic device in a third and a forth orientation, respectively. In the third embodiment, the electronic device is a display E1 equipped with the image configuration 2 of the first embodiment. The display E1 placed on a surface H on a plane XY includes a housing 1, a panel D and a stand 3. The panel D is disposed in the housing 1 which is rotatably connected to the stand 3, and the image configuration 2 is disposed on the housing 1.

When the display E1 transfers from the third orientation (as FIG. 3A) to the second position (FIG. 3B), the patterned portion 22 of the image configuration 2 is rotated about the axis a—a with the weight 23, and substantially keeps in the display status, i.e., the patterned portion 22 is not be tilted and remains in a normal letter M.

Figure 5A:
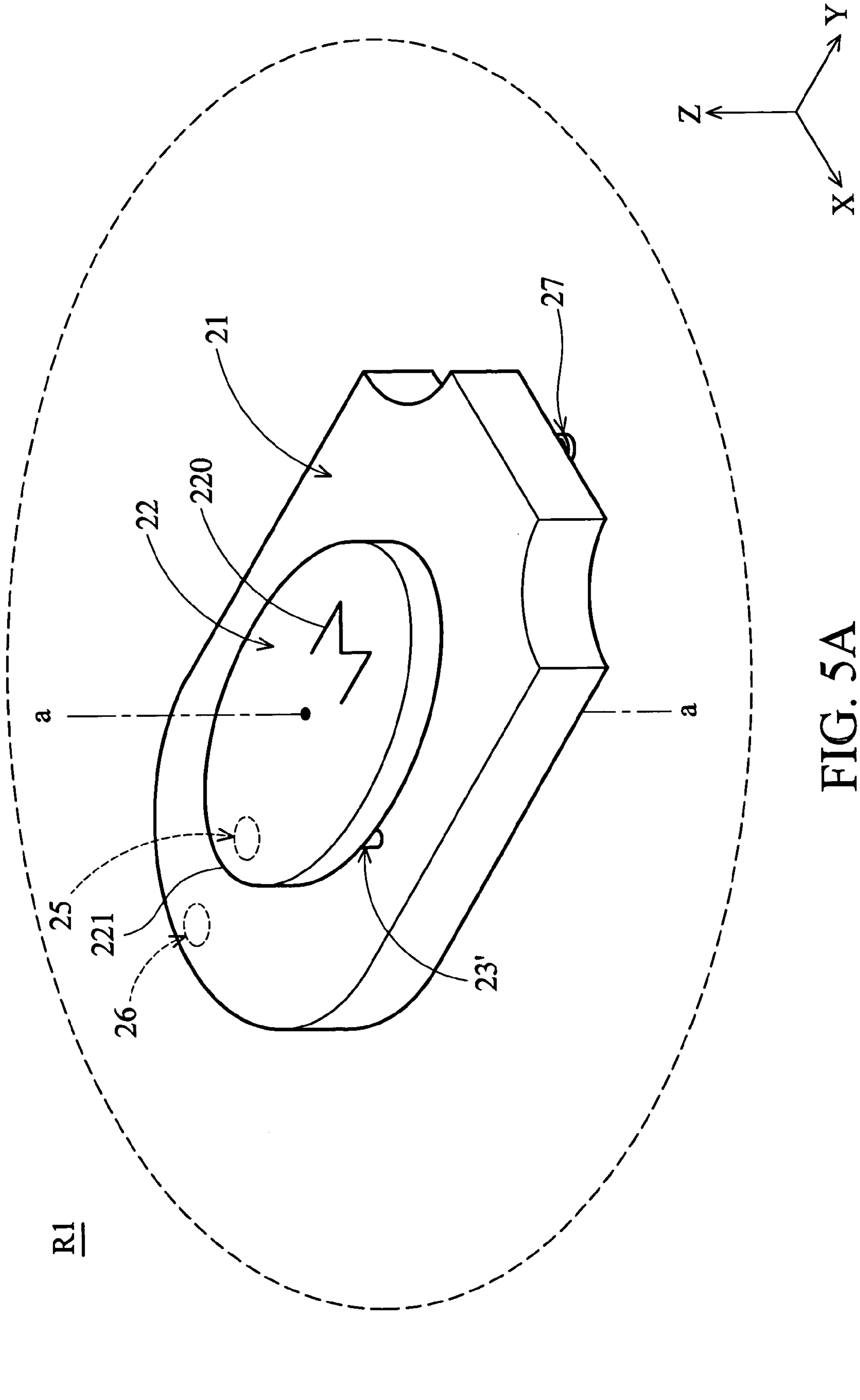
FIG. 5A is an enlarged perspective view of a region (R1) in FIG. 4A.
Figure 5B:
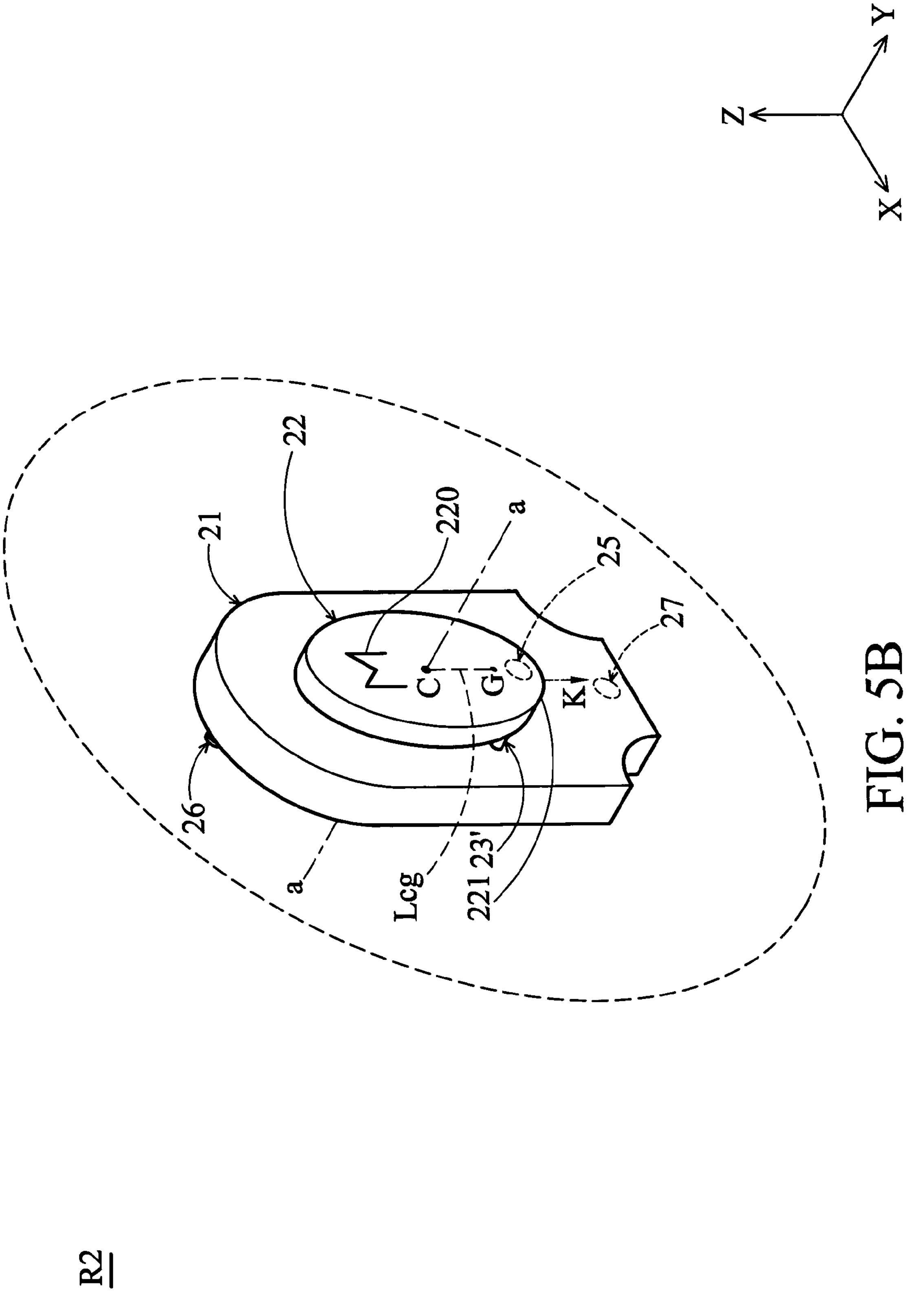
FIG. 5B is an enlarged perspective view of a region (R2) in FIG. 4B.

FIGS. 4A and 4B show a forth embodiment of an electronic device in a third and a forth orientation, respectively. FIGS. 5A and 5B are two enlarged perspective views of regions R1 and R2 in FIGS. 4A and 4B, respectively. In the forth embodiment, the electronic device is a notebook E2 equipped with the image configuration 2' of the second embodiment. The notebook E2 comprises a host e10 and a housing S1 with a panel e11 pivotally connected to the host e10 about an axis c—c, and the image configuration 2' is disposed on the housing S1.

When the notebook E2 is set in the first orientation (as FIG. 4A), the attraction between the first magnet 25 and the second magnet 26 positions the index 220 in the display status, i.e., the index 220 remains in a normal letter M viewed from direction N1. Even if the index 220 is not in the display status (the normal letter M to user) as expectation, user could make the housing S1 face to him/her first; the patterned portion 22 would be rotated with the weight 23' about the axis a—a, and the attraction between the first magnet 25 and the second magnets 26 would keep the index 220 as a normal letter M to user when the notebook E2 is set as FIG. 4A.

When the notebook E2 transfers from the first orientation (as FIG. 4A) to the second orientation (as FIG. 4B), the weight 23' rotating about the axis a—a keeps the first magnet 25 attracted by the second magnet 27, and attraction between the first magnet 25 and the second magnet 27 positions the index 220 in the display status, i.e., the index 220 is a normal letter M to observers viewed from a direction N2.

When the patterned portion 22 freely rotates, the torque generated by the weight 23' with respect to the axis a—a is greater than the magnetic force between magnets 25 and 26 or the magnetic force between the magnets 25 and 27. Thus, the image configuration 2' substantially keeps in the display status by the weight 23' regardless of the electronic device's orientation. Additionally, the patterned portion 22 is positioned by the magnetic force between magnets 25 and 26 or between magnets 25 and 27.

Figure 6:
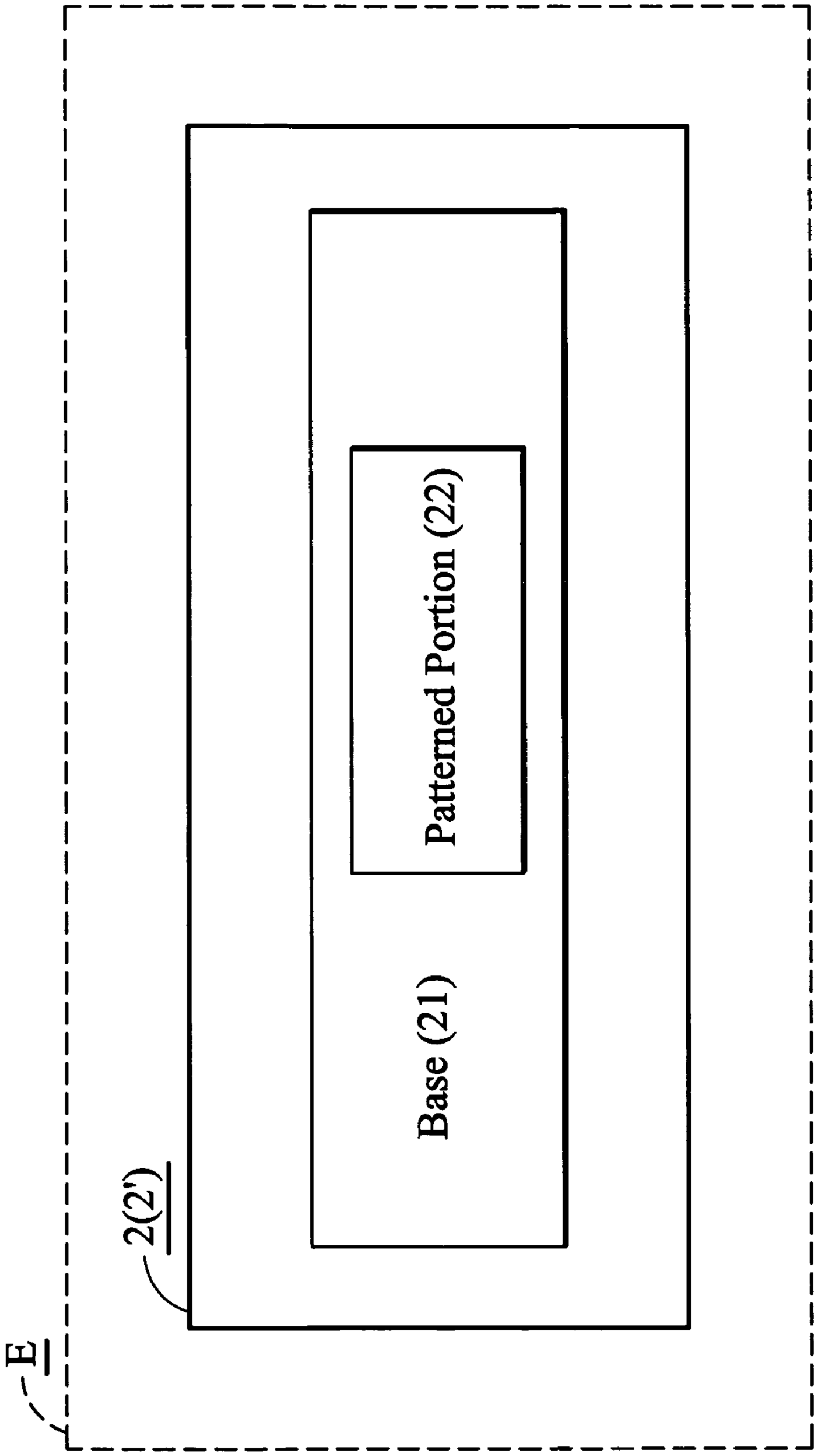
FIG. 6 is a block diagram of an electronic device (E) of the invention.

FIG. 6 is a block diagram of an electronic device E according to embodiments of the invention. The invention could apply to an electronic device E which could be selectively set vertically or horizontally, such as an external optical disc drive, a scanner or the like. The invention also could apply to those which have changes in orientation, such as notebooks and foldable phones. In FIG. 6, the image configuration 2 or 2' deposed on the electronic device E includes the base 21 and the patterned portion 22. The details are as mentioned in above embodiments. It should be understood that the patterned portion 22 and the weight 23 can be integrally formed; the base 21 and the housing of the electronic device E could be integrally formed also.

By the weight disposed on the patterned portion, regardless of the electronic device's orientation, the rotatable image configuration substantially keeps in a display status.

While the invention has been described with respect to preferred embodiment, it is to be understood that the invention is not limited thereto the disclosed embodiments, but, on the contrary, is intended to accommodate various modifications and equivalent arrangements included within the spirit and scope of the appended claims.

What is claimed is:

1. An image configuration, comprising:

a base including a second magnet; and a patterned portion rotatably disposed on the base, a weight including a first magnet opposite to the second magnet disposed on the patterned portion near a side thereof;

wherein when the image configuration moves from a first orientation to a second orientation, the patterned portion is rotated with the weight and an attraction between the first magnet and the second magnet stabilizes the patterned portion in a display status.

2. The image configuration as claimed in claim 1, wherein the patterned portion is selected from a group of letters, numbers, symbols, marks, flat patterns, cubic patterns, combinations thereof, or other indicia.

3. The image configuration as claimed in claim 1, wherein the patterned portion includes a male and the base includes a female receiving the male.

4. The image configuration as claimed in claim 1, wherein the base includes a male and the patterned portion further includes a female connected to the male.

5. The image configuration as claimed in claim 1, wherein when the patterned portion freely rotates, a torque generated by the weight is greater than the attraction between the first magnet and the second magnet.

6. An electronic device, comprising:

a housing; and an image configuration disposed on the housing, the image configuration including:

a base including a second magnet; and a patterned portion rotatably disposed on the base, including a weight including a first magnet opposite to the second magnet disposed on the patterned portion near a side thereof;

wherein when the image configuration moves from a first orientation to a second orientation, the patterned portion is rotated with the weight and an attraction between the first magnet and the second magnet stabilizes the patterned portion in a display status.

7. The electronic device as claimed in claim 6, wherein the patterned portion is selected from a group of letters, numbers, symbols, marks, flat patterns, cubic patterns, combinations thereof, or other indicia.

8. The electronic device as claimed in claim 6, wherein the patterned portion includes a male and the base includes a female receiving the male.

9. The electronic device as claimed in claim 6, wherein the base includes a male and the patterned portion further includes a female connected to the male.

10. The electronic device as claimed in claim 6, wherein the electronic device is a notebook.

11. The electronic device as claimed in claim 6, wherein the electronic device is a foldable phone.

12. The electronic device as claimed in claim 6, wherein the electronic device is a display.

13. The electronic device as claimed in claim 6, wherein the base and the housing are formed integrally.

14. The electronic device as claimed in claim 6, wherein the electronic device is a scanner.

15. The electronic device as claimed in claim 6, wherein when the patterned portion freely rotates, a torque generated by the weight is greater than the attraction between the first magnet and the second magnet.

16. An image configuration, comprising:

a base including a pair of separated second magnets; and a patterned portion rotatably disposed on the base, including a side and a weight including a first magnet disposed on the side and opposite to the separated second magnets;

wherein when the image configuration substantially moves from a horizontal position to a vertical position, the patterned portion is rotated with the weight and an attraction formed between the first magnet and one of the separated second magnets stabilizes the patterned portion in a vertical display status.

17. The image configuration as claimed in claim 16, wherein the patterned portion is selected from a group of letters, numbers, symbols, marks, flat patterns, cubic patterns, combinations thereof, or other indicia.

18. The image configuration as claimed in claim 16, wherein the patterned portion includes a male and the base includes a female receiving the male.

19. The image configuration as claimed in claim 16, wherein the base includes a male and the patterned portion further includes a female connected to the male.

20. The image configuration as claimed in claim 16, wherein when the patterned portion freely rotates, a torque generated by the weight is greater than the attraction formed between the first magnet and the separated second magnets.

* * * * *